United States Patent [19]
Lawler

[11] Patent Number: 5,905,981
[45] Date of Patent: May 18, 1999

[54] AUTOMATICALLY ASSOCIATING ARCHIVED MULTIMEDIA CONTENT WITH CURRENT TEXTUAL CONTENT

[75] Inventor: Frank A. Lawler, Seattle, Wash.

[73] Assignee: Microsoft Corporation, Redmond, Wash.

[21] Appl. No.: 08/762,430

[22] Filed: Dec. 9, 1996

[51] Int. Cl.⁶ ................................................ G06F 17/00
[52] U.S. Cl. .................... 707/4; 707/5; 707/6; 707/3; 707/531
[58] Field of Search ..................... 707/1–206, 500–532

[56] References Cited

U.S. PATENT DOCUMENTS

| | | | |
|---|---|---|---|
| 5,410,598 | 4/1995 | Shear | 380/4 |
| 5,546,107 | 8/1996 | Deretsky et al. | 707/10 |
| 5,566,349 | 10/1996 | Trout | 395/840 |
| 5,619,709 | 4/1997 | Caid et al. | 707/532 |
| 5,623,679 | 4/1997 | Rivette et al. | 707/526 |
| 5,629,980 | 5/1997 | Stefik et al. | 380/4 |
| 5,634,012 | 5/1997 | Stefik et al. | 395/237 |
| 5,799,310 | 8/1998 | Anderson et al. | 707/102 |
| 5,819,288 | 10/1998 | DeBonet | 707/104 |
| 5,832,488 | 11/1998 | Eberhardt | 707/10 |
| 5,832,495 | 11/1998 | Gustman | 707/102 |
| 5,835,712 | 11/1998 | DuFresne | 707/10 |

*Primary Examiner*—Wayne Amsbury
*Assistant Examiner*—David Yiuk Jung
*Attorney, Agent, or Firm*—Lee & Hayes, PLLC

[57] ABSTRACT

Described herein is a system that draws from an archive of media objects to associate appropriate media objects with current news articles. The media object archive includes an index having an entry for each media object. The index associates a set of one or more keywords with each media object, and a set of one or more search criteria with each media object. With regard to a particular news story, the system first identifies an initial group of relevant media objects having associated keywords that are contained in the news story. The system then evaluates the search criteria associated with each media object in the identified group against the news story, and limits the group by removing any media object from the group if the search criteria associated with that media object are not satisfied by the news story. A remaining media object from this limited group is then selected for association with the news story.

18 Claims, 2 Drawing Sheets

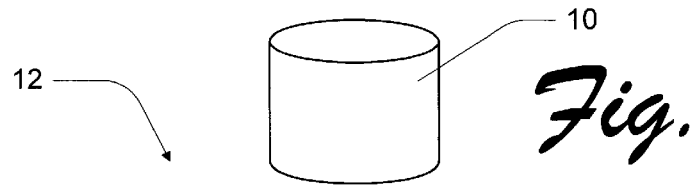

Fig. 1

| CONTENT ID | TYPE | EXPIRATION | DESCRIPTION | KEYWORDS | SEARCH CRITERIA |
|---|---|---|---|---|---|
| 1000 | BMP | N/A | MAP OF EAST SLOBOVIA, HIGHLIGHTING MAJOR CITIES OF SZPLUG, ZPLATT, AND ZSAT | EAST, SLOBOVIA, SZPLUG, ZPLATT, ZSAT | 'EAST SLOBOVIA' OR 'SZPLUG' OR 'PLATT' OR 'ZSAT' |
| 1001 | BMP | N/A | PHOTOGRAPH OF BRIG. GEN. FRANCOIS GIGUERE | GIGUERE, UN, UNITED, NATIONS | ('GIGUERE' AND 'GEN.') OR ('GIGUERE' AND 'GENERAL') OR ('UN' AND 'OBSERVER' AND 'SLOBOVIA') OR 'FRANCOIS GIGUERE' |
| 1002 | WAV | N/A | AUDIO FILE OF MIKHEL MIKHELOVICH'S BELLIGERANT SPEECH TO THE UN, MAY, 1994 | MIKHELOVICH, EAST, SLOBOVIA, FASCISM, EASTERN, EUROPE | ('MIKHELOVICH' AND 'SLOBOVIA' AND 'SLOBOVIAN DESTINY') OR ('EASTERN EUROPE' AND 'FASCISM') |
| 1003 | MPG | 12/1/95 | VIDEO OF MIKHEL MIKHELOVICH REVIEWING TROOPS AT SLOBDAY CELBRATIONS (DEC. 1, 1994) | MIKHELOVICH, EASH, SLOBOVIA, SLOBDAY | ('MIKHELOVICH' AND 'EAST SLOBOVIAN ARMY') OR ('SLOBDAY' AND 'MIKHELOVICH') |
| 1004 | BMP | N/A | PICTURE OF IVAN'S EAST SLOBOVIAN RESTAURANT | EAST, SLOBOVIA, FOOD, ETHNIC | ('SLOBOVIA' AND 'EAST' AND 'FOOD') OR ('SLOBOVIAN' AND 'CUISINE') |

Fig. 2

AUTOMATICALLY ASSOCIATING ARCHIVED MULTIMEDIA CONTENT WITH CURRENT TEXTUAL CONTENT

TECHNICAL FIELD

This invention relates to systems for automatically associating archived multimedia content with current textual content received from sources such as news feeds.

BACKGROUND OF THE INVENTION

News wire or news feed services are used by a number of organizations to provide up-to-the-minute news stories. For example, news feeds are used to provide stories for television and radio news broadcasts, for printed news media such as newspapers and magazines, and for online news providers and clipping services. Unfortunately, the overwhelming majority of such news feeds are exclusively text-based, and lack any accompanying graphics, sound bites, or video clips.

In traditional news presentation environments, such as television, radio, and newspapers, this lack of accompanying illustrative content is not a severe problem. In each of these environments, only a limited number of news stories are actually used in any given period. It is not a terribly difficult task to locate audio/video clips and/or photographs to accompany individual stories.

To help in locating appropriate audio/visual items, a production facility might choose to use one of several media management systems. There are several such systems that allow users to categorize images, video, and audio files, and to access one or more files through the use of keyword searches. Some systems also categorize text. All of these systems, however, focus on the categorization and management of media. They organize information, but do not automate the editorial process.

While an existing media management system might conceivably be adequate for some types of news distribution, it is certainly not sufficient for online news providers. An online service provider might wish to distribute a large percentage of the stories received from a news feed. To find audio/visual items manually for every one of these stories, even with the help of a prior art media management system, would be very time consuming. Nevertheless, associating multimedia content with news stories would add significant value to the services of online news providers.

SUMMARY OF THE INVENTION

The inventor has conceived a scheme for automatically locating appropriate media objects such as photographs, audio clips, and video sequences to accompany news stories. An electronic database of media objects is maintained. As new items are added to the database, each item is associated with a set of keywords and also with a set of Boolean search criteria.

When a news story is received or distributed, a group of relevant media objects is identified based on the keywords associated with the media objects. Once this group is identified, the search criteria of each media object in the group is evaluated against the news story. Any media object whose search criteria is not satisfied by the story is removed from the group of relevant media objects. A single media object from the remaining, limited group is then selected to be associated with the news story. If more than one object is in the limited group, one is chosen whose keywords appear most frequently in the news story. A historical usage database is maintained to track usage of each media object, so that overusage of a particular object can be avoided.

BRIEF DESCRIPTION OF THE DRAWINGS

FIG. 1 shows a database in accordance with the invention.

FIG. 2 shows an index of media objects in accordance with the invention.

DETAILED DESCRIPTION OF THE PREFERRED EMBODIMENT

Figure 3:
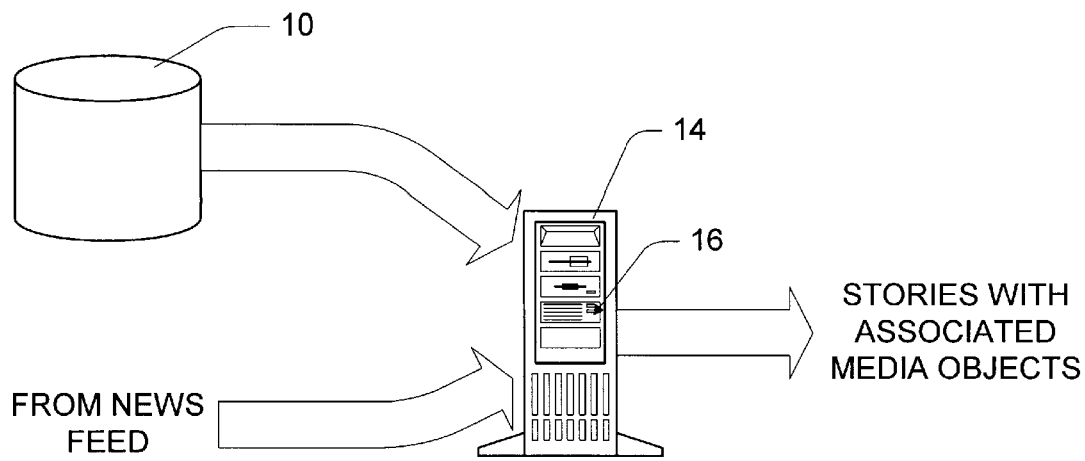
FIG. 3 shows a system in accordance with the invention for automatically associating media objects with textual articles.

FIG. 1 illustrates a database or computer-readable storage media 10 containing a plurality of media objects in accordance with the invention, for potential use with current news stories or other textual articles. Database 10 includes an index to the digitized media objects. An exemplary index 12 is illustrated in FIG. 2.

The media objects themselves comprise different types of illustrative materials, such as pictures, video sequences, audio tracks or clips, etc., embodied as multimedia files of different types. The files might include audio files, video files, two-dimensional image files, etc., in different data formats.

Index 12 has a plurality of index entries, represented by rows in FIG. 2. The index entries correspond respectively to different media objects. Each entry comprises six fields in this embodiment of the invention. The fields are aligned as columns in FIG. 2, and are labeled along the top of the figure.

Each entry or record corresponds uniquely to a single media object. A first field in index 12, labeled "CONTENT ID", comprises an arbitrary numeric identifier that corresponds uniquely with the media object corresponding to the index entry. Alternatively, the media object might be included as part of the index entry itself.

A second field, labeled "TYPE", contains a code indicating the format of the corresponding media object. "BMP", for instance, indicates a particular type of file format for a two-dimensional image. "WAV" indicates another file format for audio files. "MPG" is a file format for video sequences. Other formats and file types can also be used.

A third field, labeled "EXPIRATION", indicates a date, if applicable, after which the media object is no longer useful. An example of a perishable image would be "Bob Johnson Wins 1995 US Open". This image would have an expiration date matching that of the 1996 US Open, after which the association of Bob Johnson with the winner of the 1995 US Open would be meaningless in terms of sports news—Bob Johnson was the US Open champion only during 1995–1996.

A fourth field, labeled "DESCRIPTION", contains a narrative description of the corresponding media object. This text might be used as a caption for a media object when it is chosen to accompany a textual article.

A fifth field, labeled "KEYWORDS", contains a list of keywords that are relevant to the corresponding media object.

A sixth field, labeled "SEARCH CRITERIA", contains a Boolean text search specification or criteria. As will be described below, this search criteria is applied against textual articles. A media object will be used with a particular textual article only if its search string evaluates true against the textual article. In the preferred embodiment of the invention, the search criteria are SQL (Structured Query Language) statements.

Database 10 and index 12 are compiled manually, by human operators. Database maintenance involves at least the following steps: (a) obtaining and storing a plurality of media objects such as video sequences, audio clips, or two-dimensional images; (b) formulating a description or caption for each image; (c) associating a set of one or more keywords with each image; and (d) associating a set of one or more search criteria with each image. Media objects are acquired from any and all sources possible, local and international, with the goal of building an enormous content vault from which information can be drawn, used, and reused.

FIG. 3 shows an automated system for associating media objects with specified textual content in accordance with one embodiment of the invention. The system includes database 10, which includes index 12. The system also includes a computer 14 connected to access database 10. In practice, database 10 might be maintained within storage that is internal to computer 14. Computer 14 has a computer-readable storage medium 16 such as electronic memory or non-volatile disk-based memory that stores instructions for performing various methodological steps described below.

Computer 14 is connected to receive news stories from a news feed. Computer 14 is further configured to find media objects from database 10 that are relevant to incoming news stories, and to create an association between news stories and such relevant media objects. Relevant media objects are selected based on their keywords and search criteria. In the embodiment shown, the computer actually attaches relevant media objects to news stories and sends them to some destination for further use or distribution. For instance, the stories and associated media objects might be sent to a database for online distribution from a service provider such as an Internet service provider. Alternatively, the stories and associated media objects might be distributed directly to consumers in response to specific requests.

Figure 4:
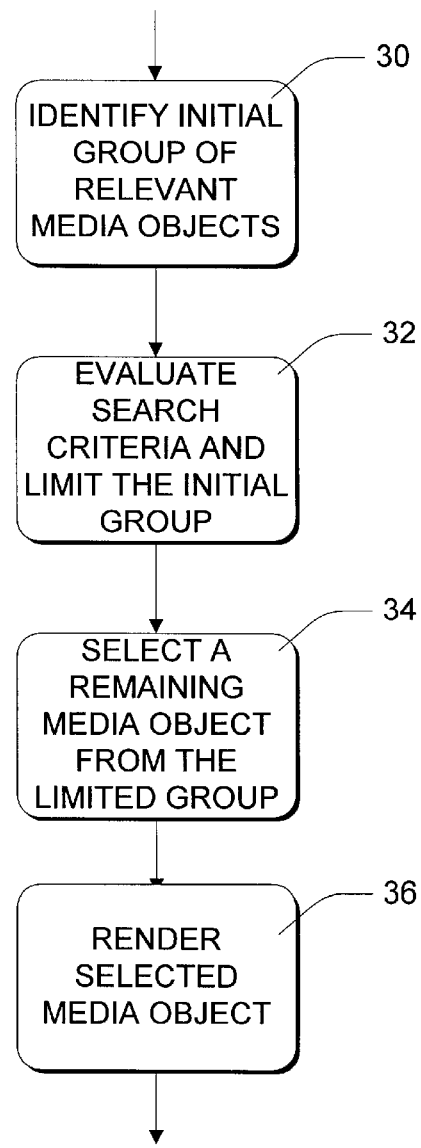
FIG. 4 is a flowchart showing preferred methodological steps in accordance with the invention.

FIG. 4 shows steps performed by computer 14 for associating an image or other media object with a selected article or portion of an article from a news feed. In the embodiment described herein, a media object is actually assigned to or associated with each paragraph of an article. Other embodiments might assign a single media object to an entire article, using the same steps described herein.

A step 30 comprises identifying a group of relevant images having associated keywords that are contained in the current paragraph or other segment of the selected article. To facilitate this step, all keywords used in database 10 are normalized into a separate table, sorted, and keyed to enable a quick isolation of all content items which have any relevance to the specified word or words.

To illustrate this process, consider the following paragraph (actually a title) from a hypothetical news article: "East Slobovia Menaces Western Neighbor". Note that non-proper nouns are considered irrelevant and are ignored. Accordingly, the paragraph can be considered to have only two pertinent words: "East" and "Slobovia". Referring to the index of FIG. 2, the word "East" is a keyword in four of the five entries. The work "Slobovia" is similarly a keyword in the same four of the five entries. We can assume, however, that the example database contains a large number of additional entries whose keywords include the fairly general term "East". Suppose, then, that a keyword search finds 1000 media objects having the keyword "East", but only the four shown in FIG. 2 having the keyword "Slobovia".

In accordance with the invention, the initial group identified in step 30 comprises those media objects whose keywords occur most often in the specified textual paragraph. Thus, only the four entries in FIG. 2 having both of the keywords "East" and "Slobovia" qualify—they each have keywords that occur twice in the paragraph.

Different thresholds can be used in step 30 to identify the most relevant media objects. For example, computer 14 might identify only those media objects that are tied with each other for having the most number of keyword hits. As an alternative, computer 14 might identify media objects having the most and the next-to-the-most keyword hits. There are various other possibilities.

A subsequent step 32 comprises evaluating the search criteria associated with each image in the initial group resulting from step 30 against the specified article paragraph, and limiting the group by removing any media object from the group if the search criteria associated with that image is not satisfied by the text of the paragraph.

The FIG. 2 entry having Content ID 1000 has the following search criteria: 'EAST SLOBOVIA' OR 'SZPLUG' OR 'PLATT' OR 'ZSAT'. This criteria evaluates true with regard to the paragraph "East Slobovia Menaces Western Neighbor": this paragraph contains the search term "EAST SLOBOVIA". None of the other search criteria of the media objects of the group, however, evaluate true. Thus, these media objects are removed from the group, leaving only the entry having Content ID 1000. This media object, then, is the most relevant media object.

A step 34 comprises selecting a remaining media object from the limited group to associate with the specified textual paragraph. In some cases, the search criteria of more than one media object from the initially identified group will evaluate true. In such cases, the limited group will have a plurality of media objects, and a media object is chosen whose keywords occur most often in the article paragraph. If this strategy fails to resolve to a single media object, one of the remaining media objects is chosen arbitrarily.

A step 36 comprises showing or otherwise rendering a selected media object along with the specified textual content. This step is often performed external to computer 14, such as by an end user's computer after news stories have been distributed with their associated media objects.

Computer 14 runs a daily purging application which clears all data left over from the previous day. However, the invention includes a step of maintaining a historical usage database to track usage of the media objects. This database lists articles, the media objects that have been associated with the articles, and the date of the associations. Instead of purging the previous day's media objects, computer 14 can optionally refer to this database to avoid over-using media objects. For example, if the same picture of Mikhel Mikhelovitch has already been used more than twice in the last week, it might be passed over in favor of the next-highest ranked item (if one exists) from steps 30 and 32.

This system collects timely news feed data from local, national, and international news services. Editorial input is required only for the media objects themselves, which are not particularly time-sensitive. This input can be re-used many times in most cases. Reprocessing this information to yield a multimedia presentation is done automatically. If desired, an editorial pass can be added to the assembly stage of the process in which the editor's work load is reduced simply to sanity-checking the appropriateness of automatic selections, and overriding those automatic media choices if necessary.

The invention can be used in many environments. One of the most apparent uses is in distributing online content, through a wide area network such as the Internet. In this environment, multimedia presentations can be formulated using HTML (hypertext markup language) formatting commands to include both textual content and other media objects that have been automatically identified as described above. The invention can also be used for interactive television systems, to associate appropriate video with textual stories. Similarly, the invention can be used in conjunction with anchor scripts for television news broadcasts, to generate appropriate graphics for each story with little or no human intervention.

In compliance with the statute, the invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of selecting one of a plurality of media objects to associate with specified textual content, comprising the following steps:
   associating a set of one or more keywords with each media object;
   associating a set of one or more search criteria with each media object;
   identifying a group of relevant media objects having associated keywords that are contained in the specified textual content;
   evaluating the search criteria associated with each media object in the identified group against the specified textual content;
   limiting the group by removing any media object from the group if the search criteria associated with that media object are not satisfied by the specified textual content;
   selecting a remaining media object from the limited group to associate with the specified textual content.

2. A method as recited in claim 1, the step of identifying a group of relevant media objects comprising identifying those media objects whose keywords occur most often in the specified textual content.

3. A method as recited in claim 1, the selecting step comprising selecting a media object from the limited group whose keywords occur most often in the specified textual content.

4. A method as recited in claim 1, further comprising maintaining a historical usage database to track usage of the media objects.

5. A method as recited in claim 1, wherein the selected media object is an image, further comprising showing the selected image along with the specified textual content.

6. A computer programmed to perform the steps recited in claim 1.

7. A computer-readable storage medium having instructions for performing the steps recited in claim 1.

8. An automated method for associating images with news feed articles, comprising the following steps:
   obtaining a plurality of images;
   associating a set of one or more keywords with each image;
   associating a set of one or more search criteria with each image in addition to the set of one or more keywords;
   selecting a particular article from a news feed;
   identifying a group of relevant images having associated keywords that are contained in a portion of the particular article from the news feed;
   evaluating the search criteria associated with each image in the identified group against the portion of the particular article;
   limiting the group by removing any image from the group if the search criteria associated with that image is not satisfied by the portion of the particular article;
   associating a remaining image from the limited group with the portion of the particular article.

9. A method as recited in claim 8, the step of identifying a group of relevant images comprising identifying those images whose keywords occur most often in the portion of the particular article.

10. A method as recited in claim 8, the step of associating a remaining image from the limited group with the portion of the particular article comprising selecting an image from the limited group whose keywords occur most often in the portion of the particular article.

11. A method as recited in claim 8, further comprising maintaining a historical usage database to track usage of the images.

12. A computer programmed to perform the steps recited in claim 8.

13. A computer-readable storage medium having instructions for performing the steps recited in claim 8.

14. A computer-readable medium having computer-executable instructions for performing steps to select one of a plurality of media objects to associate with a specified textual content, the steps comprising:
   associating a set of one or more keywords with each media object;
   associating a set of one or more search criteria with each media object;
   identifying a group of relevant media objects having associated keywords that are contained in the specified textual content;
   evaluating the search criteria associated with each media object in the identified group against the specified textual content;
   limiting the group by removing any media object from the group if the search criteria associated with that media object are not satisfied by the specified textual content;
   selecting a remaining media object from the limited group to associate with the specified textual content.

15. A computer-readable medium as recited in claim 14, the step of identifying a group of relevant media objects comprising identifying those media objects whose keywords occur most often in the specified textual content.

16. A computer-readable medium as recited in claim 14, the selecting step comprising selecting a media object from the limited group whose keywords occur most often in the specified textual content.

17. A computer-readable medium as recited in claim 14, the steps further comprising maintaining a historical usage database to track usage of the media objects.

18. A computer-readable medium as recited in claim 14, wherein the selected media object is an image, the steps further comprising showing the selected image along with the specified textual content.

* * * * *